July 14, 1970
D. E. HORNING ET AL
3,520,393
APPARATUS FOR LIFTING AND TRANSFERRING ARTICLES BETWEEN
DIVERSE CONVEYING SYSTEMS
Filed June 18, 1968
4 Sheets-Sheet 1
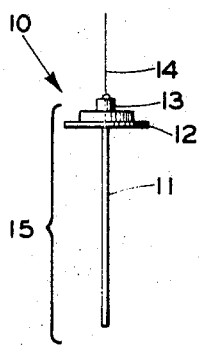
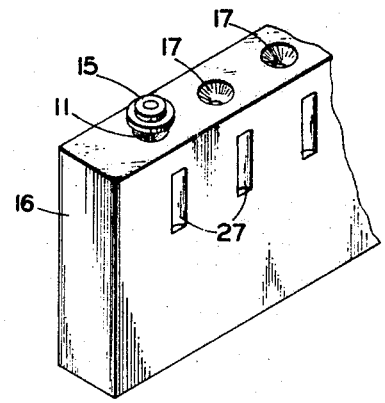
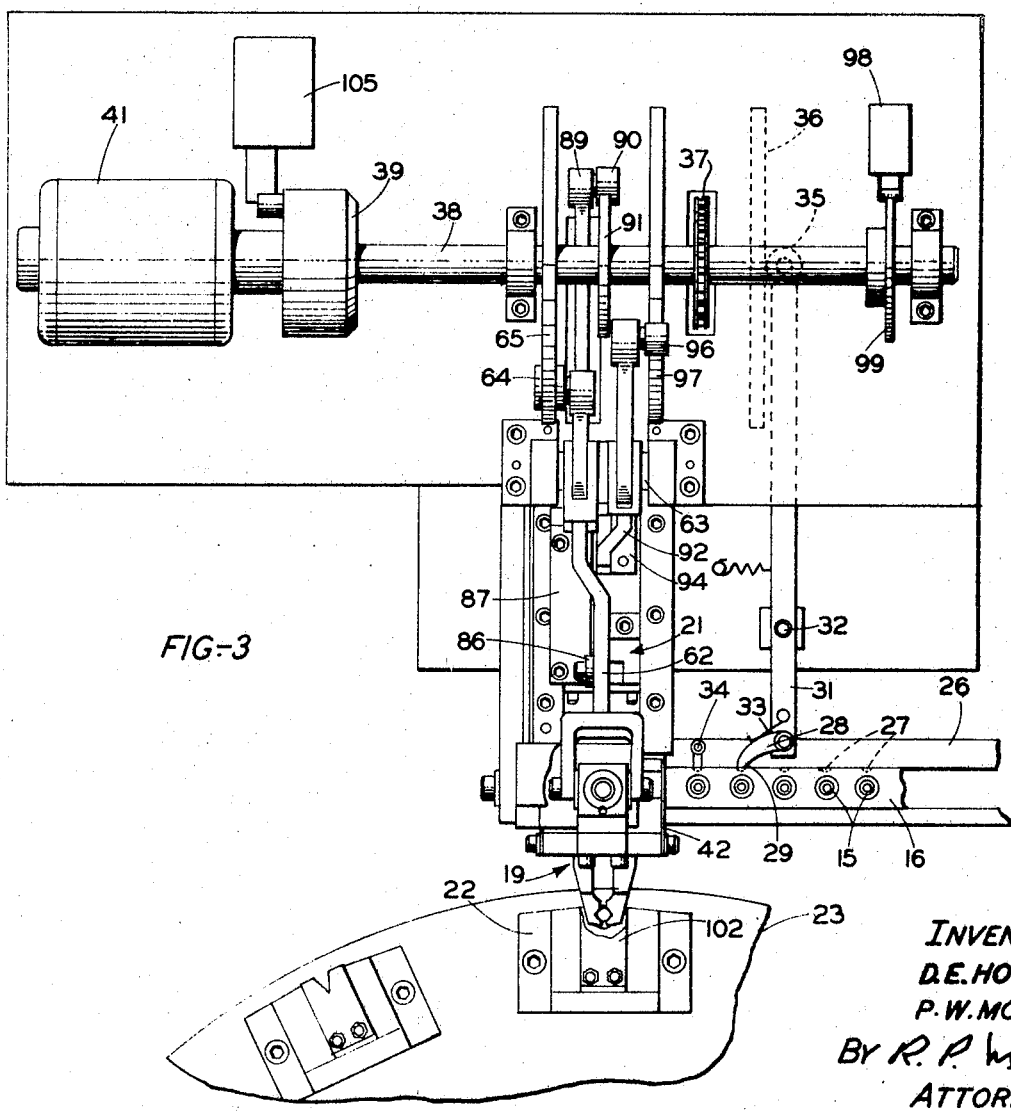
INVENTORS
D.E. HORNING
P.W. MOYER
By R. P. Miller
ATTORNEY

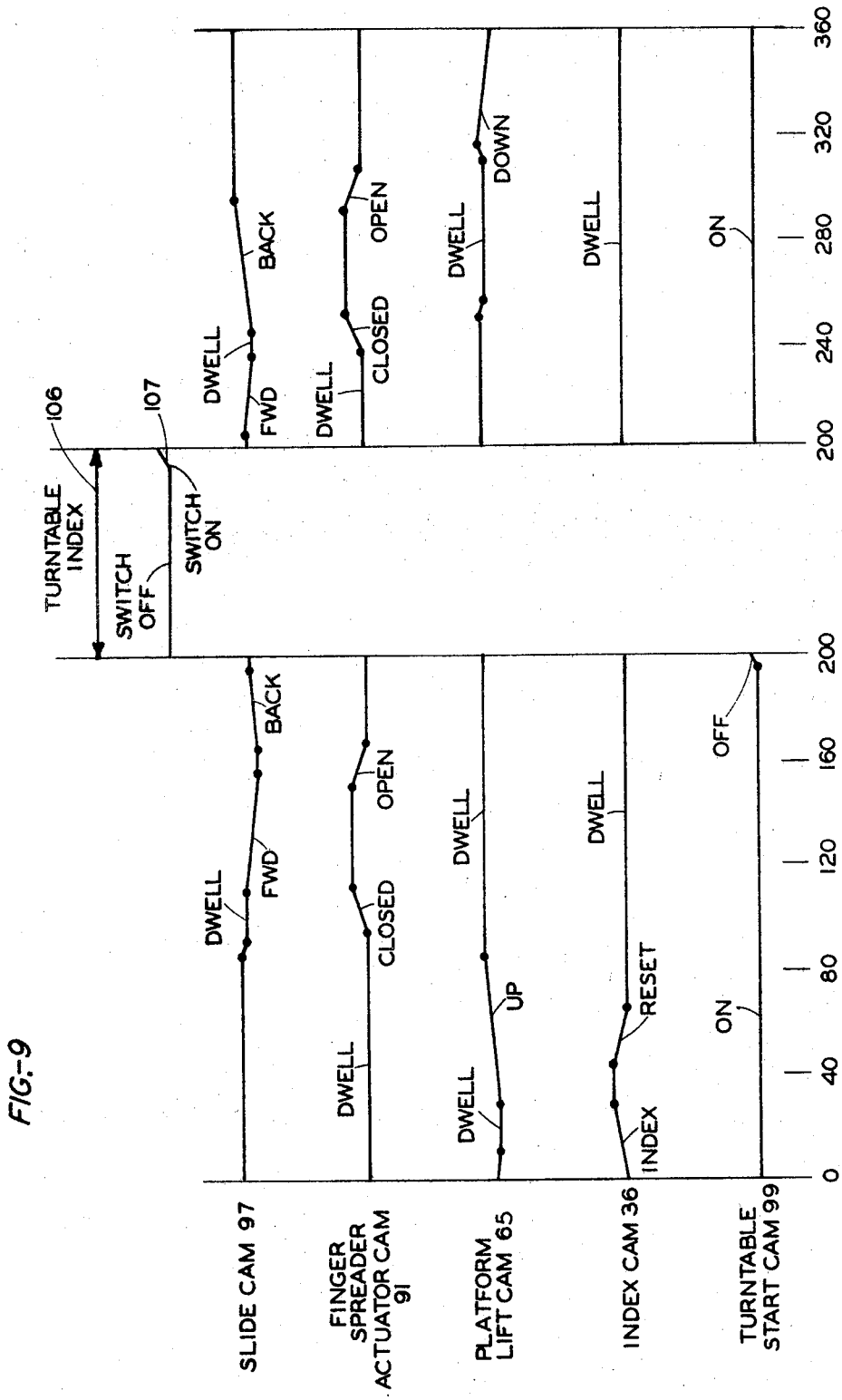

United States Patent Office 3,520,393
Patented July 14, 1970

3,520,393
APPARATUS FOR LIFTING AND TRANSFERRING ARTICLES BETWEEN DIVERSE CONVEYING SYSTEMS
Donald E. Horning and Paul W. Moyer, Wyomissing, Pa., assignors to Western Electric Company, Incorporated, New York, N.Y., a corporation of New York
Filed June 18, 1968, Ser. No. 737,953
Int. Cl. B65g 46/06
U.S. Cl. 198—20                    9 Claims

ABSTRACT OF THE DISCLOSURE

A lift and transfer apparatus lifts successive diodes advancing in a rectilinear row whereafter each diode is transferred into a welding machine and then back into the lift and transfer apparatus which functions to return each diode for subsequent rectilinear movement. The apparatus includes a lift platform having a T-shaped slot, the cross slot of which guides the diodes during rectilinear movement, and the stem slot of which guides the diodes during transfer by an auxiliary feeder mechanism.

BACKGROUND OF THE INVENTION

Field of the invention

This invention relates to apparatus for lifting and transferring articles between diverse conveying systems and more particularly, to apparatus including a lift platform in which is formed a T-slot for receiving and guiding articles into and out of a fabricating machine, together with facilities for elevating and lowering the platform to position the articles at various elevations so that the articles may be moved to and from the branches of the T-slot.

Technical considerations and prior art

With automated manufacture of many types of articles it is often necessary to transfer the articles from one type of conveying system to another type, e.g., transfer from a rectilinear system to a rotary system. Another problem that often exists with article moving facilities is the requirement to provide conveying systems wherein articles are transported at a first elevation through a portion of the facilities and then transported at a second elevation through other sections of the facilities.

Considering the manufacture of semiconductor diodes the components may be transported in a basic holder such as a rack which is moved between various assembling machines so that diodes may be transferred into the machines for various assembling and testing operations. These racks can be conveniently moved in rectilinear fashion and various transfer devices may be provided to remove the diode components from the rack, feed the components into fabricating machines and then return the fabricated diodes to the racks or deliver the components to other receiving facilities. Typical examples of such article transfer devices may be found in Pat. No. 3,243,036 issued May 29, 1966 to C. R. Fegley and in Pat. No. 3,407,949 issued Oct. 29, 1968 to C. R. Fegley.

It is now deemed expedient to provide an article transfer mechanism which can be selectively interposed in the path of movement of a rectilinearly advancing row of diodes to positively receive and elevate the diodes into a position where an auxiliary feed device may be operated to advance a partially fabricated diode into a turntable-type welding machine. This machine functions to weld component elements to the diode and then it must return the diode to the transfer device whereafter the transfer device must function to return the fabricated diode for further rectilinear movement.

SUMMARY OF THE INVENTION

The present invention contemplates a transfer and lift device that may be cyclically positioned in the path of a rectilinearly advancing row of articles to intercept the leading articles seriatim, and then lift each article into a position whereat an auxiliary feeder device is rendered effective to move the lifted article traversely into a rotary-type conveyor. The invention also contemplates that the lift and transfer device will function to remove a fabricated article from the rotary-type conveyor and return this article for further movement in the rectilinear path.

More specifically, the lift device may include a platform with a T-shaped slot formed so that articles move through an entrance section of the cross slot whereupon the device is elevated and the auxiliary feeder device functions to move the lifted article along the stem slot into the rotary conveyor. This rotary conveyor advances the articles through one or more fabricating, assemblying and test stations and returns the articles to the initial position. The lift device is maintained in the elevated position so that the auxiliary feeder device may be operated to pick up a fabricated article and move it back down the stem slot. Next, the lift device functions to lower the article to the initial elevation where the article is advanced rectilinearly along an exit section of the cross slot and on out of the manufacturing machine.

BRIEF DESCRIPTION OF THE DRAWING

Other advantages of the present invention will be apparent from the following detailed description when considered in cooperation with the accompanying drawing wherein:

FIG. 1 is a side view of a semiconductor diode which may be handled by the apparatus of the present invention;

FIG. 2 is a perspective view of a rack for receiving diodes;

FIG. 3 is a plan view of apparatus for removing partially fabricated diodes from the rack, lifting and transferring the diodes into an associated turntable, and returning completed diodes to the rack, embodying the principles of the present invention;

FIG. 9 is a cam timing diagram graphically illustrating thte relative motions and operations of the lift and transfer facilities together with a showing of the operation of the turntable.

DETAILED DESCRIPTION

Figure 4:
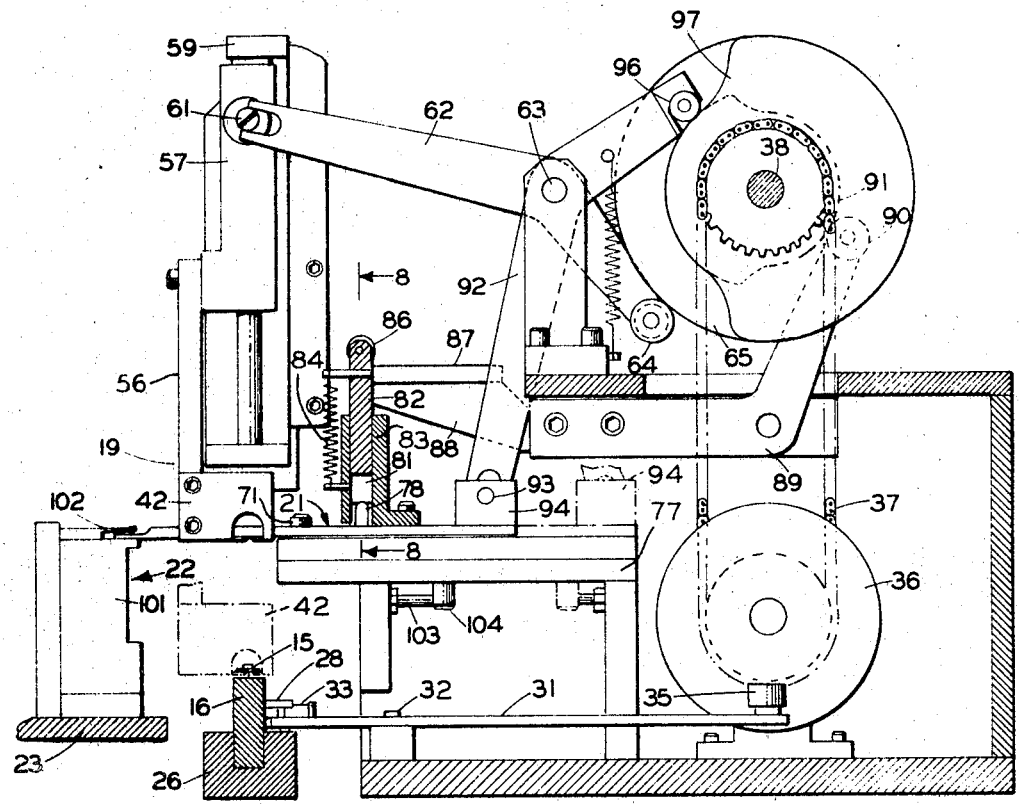
FIG. 4 is a side elevational view, partially in section, illustrating lift and transfer facilities with respect to the rack and turntable.

Referring to FIG. 1, there is shown a typical article that may be expeditiously lifted and transported by the appaartus of the instant invention. The article serving to illustrate the invention is a diode 10 which comprises an elongated stud wire or lead 11 and a header disc or platform 12 onto which are welded (1) a semiconductor wafer 13 and (2) a beaded gold lead 14. Initially the stud wire and header disc, termed disc stud assembly 15, are loaded in racks 16 shown in FIG. 2 and further disclosed in the afore-identified patent and copending application to C. R. Fegley. The rack is rectangular in cross section and length and has a plurality of aligned, flared mouth blind bores 17 extending from the top surface to receive the stud wires 11 and hold the header discs 12 in an elevated position above the top surface of the rack.

In general, the overall installation contemplates cyclically advancing each rack to move each disc stud assembly into a lift device 19 (see FIGS. 3, 4 and 5) which functions to elevate each disc stud assembly 15 into position whereat an auxiliary feed device 21 functions to grip the disc stud assembly and advance it through the lift device into one of a series of nests 22 secured about the periphery of a turntable 23. This turntable 23 is indexed cyclically to move each assembly through various fabricating, welding and test stations (not shown). As the disc stud assembly is advanced, the semiconductor wafer 13 and the balled lead wire 14 are welded onto the header disc 12. Upon the turntable advancing each completed diode 10 to the initial load position, the auxiliary feed device 21 again functions to grip and move the completed diode back through the lift device. The lift device is again lowered to reinsert the fabricated diode into a previously vacated bore 17 in the rack 16. Upon subsequent incremental movement of the rack, the completed diode 10 is advanced from the lift device 19.

Considering now the datails of construction of the component mechanisms, the overall installation is mounted in a suitable frame having a base on which is mounted a channel guide 26 for receiving and guiding the racks 16 for rectilinear movement. Looking again at FIG. 2 it will be noted that each rack 16 has a number of notches 27 formed along one side and individually aligned with the bores 17. A feed pawl 28 (see FIG. 3) has a nose section 29 resting in one of the notches 27. This feed pawl is pivotally mounted at one end to a cam follower lever 31 which in turn is pivotally mounted on a stud shaft 32. A spring 33 urges the nose section of the pawl 28 to bear against the side of the rack 16. A spring urged antiretrograde pawl 34 is provided to preclude reverse movement of the rack when the pawl 28 is withdrawn in anticipation of another feed cycle. Attached to the opposite end of the lever 31 is a cam follower roller 35 riding on the surface of a face cam 36 rotated by a chain drive 37 from a shaft 38. The shaft 38 is connected through a one revolution clutch 39 to a drive motor 41. Upon rotation of the face cam 36, the lever 31 is oscillated back and forth to move the feed pawl 28 to the next succeeding notch 27 to advance the rack 16 one increment and thus move a disc stud assembly 15 into the lift device 19.

Figure 5:
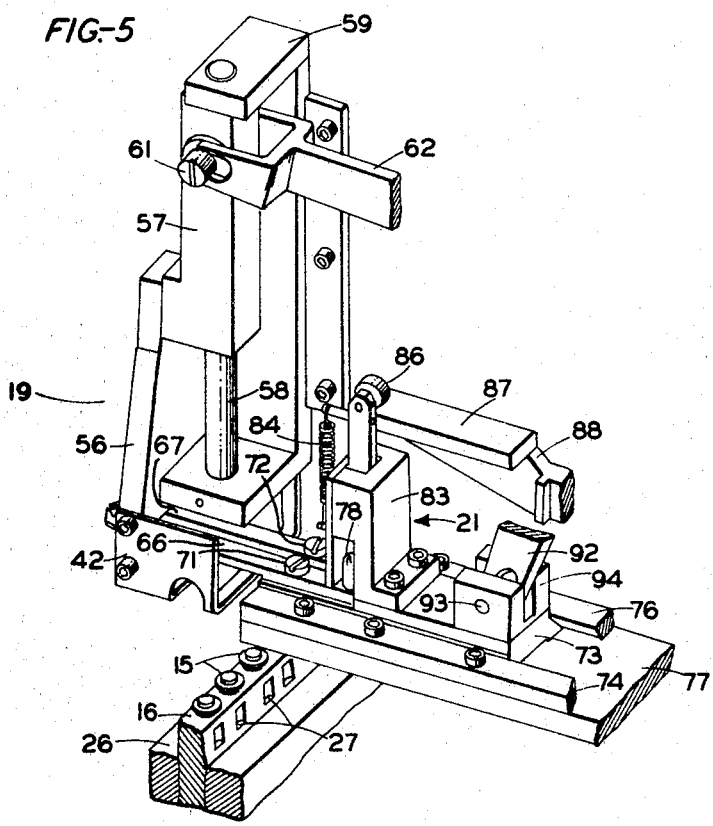
FIG. 5 is a perspective view of the lift and transfer facilities.
Figure 6:
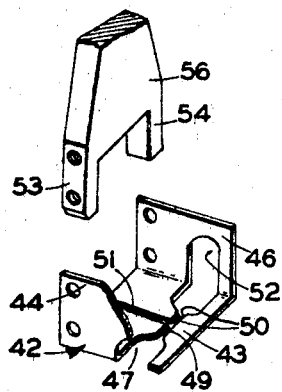
FIG. 6 is an exploded perspective view of a lift bracket particularly showing the arrangement of slots along and through which the diodes are moved.

Attention is now directed to FIGS. 4, 5, 6 and 7 for consideration of the lift device 19. Lifting of the disc stud assemblies is attained by use of a slotted U-shaped bracket, generally designated by the reference numerals 42. The bracket may be constructed of sheet metal as best illustrated in FIGS. 5 and 6 and includes a bottom platform section 43 and a pair of slide walls 44 and 46. The bracket has a T-shaped slot therethrough comprising a wide mouth entrance sctioen 47 which extends from the left-hand side wall 44 and across a portion of the platform 43, terminating in a necked-down or restricted slot 49 having a width sufficient to accommodate the stud wire 11, but being smaller than the diameter of the header disc 12 so that the disc stud assembly may be supported on ledges 50 in this section of the lift device. Extending from the restricted slot 49 is a delivery or stem section 51 of the T-slot. In addition, the restricted section 49 flares out into an exit section 52 which extends up into the right-hand side wall 46.

Referring to FIGS. 4, 5 and 6, the bracket may be lifted by attaching it to the forked ends 53 and 54 of a plate 56 secured to a slide block 57. Between the forked ends 53 and 54, there is provided sufficient space to permit the passage of sections of the auxiliary feed device 21 in delivering a disc stud assembly to a nest 22. Slide block 57 is mounted for movement along a guide rod 58 connected at opposite ends to a stationary support bracket 59. Trunnions 61 extend from the slide block 57 into slotted bifurcations formed in the ends of a fork lever 62 which is pivotally mounted about a pivot shaft 63. The opposite or free end of the lever 62 has a cam follower roller 64 mounted thereon to ride upon the periphery of a cam 65 fixed to the drive shaft 38.

Figure 8:
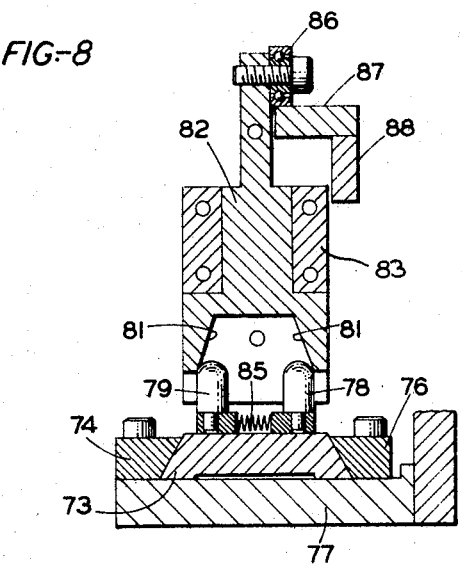
FIG. 8 is a sectional view taken along line 8—8 of FIG. 4 particularly showing a wedge cam for operating the feed fingers.
Figure 7:
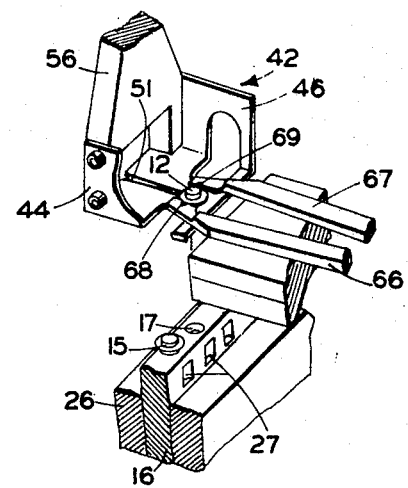
FIG. 7 is a perspective view of the lift bracket and a set of feed fingers for gripping and feeding a diode along one slot.

In order to transfer a lifted disc stud assembly from the lift bracket 42, the auxiliary feeder device 21 is provided. This feeder device includes a pair of fingers or jaws 66 and 67 having notches 68 and 69 to accommodate and grip a header disc 12 as shown in FIG. 7. These fingers are pivotally mounted on pins 71 and 72 (see FIGS. 4 and 5) that extend from a slide 73 having a dove-tail shaped lower section positioned between beveled gibs 74 and 76. The gibs in turn are fixed to a base plate 77 which is part of the overall frame. Secured to and extending from the rear or second ends of the fingers 66 and 67 are two pins 78 and 79 (see also FIG. 8) positioned in register with a double wedge, spreader cam 81 formed on the lower end of a slide bar 82. The slide bar is journalled within an opening formed in a post 83 extending from and secured to the slide 73. Urging the spreader bar 82 in a downward direction is a spring 84 interconnected between pins extending from the post 83 and the spreader bar 82, respectively. A spring 85 is interposed between the ends of the fingers 66 and 67 to urge the pins 78 and 79 into engagement with the U-shaped walls of the double wedge spreader cam 81. Mounted in the vicinity of the upper end of the slide bar 82 is a roller 86 (see FIGS. 4, 5 and 8) riding on a flat, upper bearing surface 87 of a lever 88. This lever is pivotally mounted on a pivot shaft 89 and the opposite end of the lever is provided with a cam follower roller 90 riding on a spreader actuator cam 91 fixed to the shaft 38.

When the lift device 19 is elevated and the auxiliary feeder 21 is operated, a header disc is gripped by the fingers 66 and 67 and then advanced towards an aligned nest 22. Movement is imparted to the slide 73 by a lever 92 pivotally mounted on pivot shaft 63 and bifurcated at one end to span a drive pin 93 secured in a slotted mount 94 which is attached to the slide. The opposite end of this lever 92 has a follower roller 96 mounted thereon to ride upon the periphery of a slide operating cam 97. During this movement of the feeder 21, the depending stud wire 11 rides in the stem slot 51. The turntable which may be considered as a rotary conveyor is cyclically advanced by a motor (not shown), but is initiated into operation by the closure of a switch 98 actuated by a cam 99 fixed to the shaft 38. Nests 22 are positioned about the periphery of the turntable to receive and hold the disc stud assemblies as each is advanced through a number of stations (not shown) whereat the wafer 13 is welded onto the header disc 12 and then the balled lead 14 is welded onto the header disc. Each nest 22 includes a bifurcated support 101 for accommodating the stud wire 11 and a bifurcated leaf spring holder 102 which bears against the top of the header disc 12 to hold the disc stud assembly 15 in the nest 22.

In summary, considering the overall operation, attention is directed to various views and to cam timing diagram (FIG. 9) which graphically depicts the relative movements of the various component mechanisms. A rack 16 (see FIG. 3) filled with disc stud assemblies 15 is placed in channel 26 so that the nose 29 of the pawl 28 falls within a notch 27. Assume now that the drive shaft 38 is rotating, then, through the chain drive 37, the face cam 36 is rotated and effective to oscillate the lever 31 causing the pawl 28 to advance the rack 16 one increment. The leading disc stud assembly 15 moves through the entrance slot 47 of the lift bracket 42 (see FIGS. 4, 5 and 6) and into the restricted section 49 so that the header disc 12 overlies the ledges 50. At this time, the platform lift cam 65 acts on the cam follower 64 to pivot the lever 62 in a clockwise direction, whereupon the slide block 57, the plate 56 and the U-shaped lift bracket 42 move upwardly, positioning the header disc 12 in alignment with the gap between the now withdrawn fingers 66 and 67. It should be noted that at the start of a cycle, the spreader actuator cam 91 functions to maintain the double wedge spreader cam 81 in a down position to engage the pins 78 and 79 and spread apart the notched ends of the fingers 66 and 67.

While the fingers 66 and 67 are spread, the slide operating cam 97 is effective to pivot the lever 92 in a clockwise direction to advance the slide 73 toward the left to position the arcuate notches 68 and 69 of the fingers 66 and 67 about the header disc 12. When the notches 68 and 69 are positioned about the header disc 12, the spreader actuator cam 91 pivots the lever 88 in a clockwise direction so that the bar 82 and the spreader cam 81 move away from the pins 78 and 79 to allow the spring 85 to expand and close the fingers about the header disc 12. Next, the cam 97 pivots the lever 92 to advance the slide 73 toward the left to move the now gripped disc stud assembly into an aligned nest 22. During the movement, the depending stud wire 11 is moved from the intersection of the slots 49, 51 and 52 and is guided by the stem slot 51. The advance of the slide 73 may be limited by setting an adjustable stop 103 to engage a pin 104 extending from the bottom of the slide through a slot formed in the base plate 77. The header disc is positioned between the supports 101 and the left spring holder 102. It will be noted that as the slide 73 moves forward, the roller 86 merely rides along the flat surface 87 of the spreader actuating lever 88. Now, the finger spreader actuator cam 91 is again effective to pivot the lever 88 to drive the spreader cam 81 against the pins 78 and 79 so that the fingers 66 and 67 are spread apart permitting the slide 73 to be slightly withdrawn by the slide operating cam 97. The fingers 66 and 67 are thus moved back, leaving the disc stud assembly 15 in the nest 22.

Upon completion of the loading of the nest 22 and the partial withdrawal of the slide 73, the cam 99 is effective to operate the switch 98 which functions to operate a solenoid 105 which in turn controls the disengagement of the one revolution clutch 39. Also, at this time a circuit is completed to energize control facilities for rotating the turntable 23 one increment to advance the loaded nest toward the associated fabricating stations while a nest 22 with a completely fabricated diode 15 is advanced into register with the now spread apart and partially withdrawn fingers 66 and 67.

Upon completion of the index of the turntable 23, illustrated by time line 106 on FIG. 9, a circuit (not shown, but graphically illustrated by time line 107) is completed to again operate the solenoid 105 to initiate operation of the one revolution clutch 39. Shortly thereafter, the slide operating cam 97 on the again rotating shaft 38 is effective to again pivot the lever 92 to advance the slide 73 to position the fingers 66 and 67 about the header disc 12 of the newly positioned completed diode 15. The spreader actuator cam 91 pivots the lever 88 to move the spreader bar 82 and cam 81 upwardly so that the fingers 66 and 67 close and grip the header disc 12. Next, the slide operating cam 97 functions to restore the slide 73 to position the completed diode at the intersection of the slot 51 and the restricted slot 49. Now the spreader actuator cam 91 is again rendered effective to move the spreader bar 82 and cam 81 to open the fingers 66 and 67 whereafter the lift cam 65 pivots the lever 62 to move the lift platform 42 downwardly to deposit the depending stud wire 11 of the completed diode 15 in the vacated bore 17 in the rack 16. Upon deposit of the completed diode in the lift bracket 42, the various mechanisms are restored to the initial rest position awaiting another cycle operation of the overall machine.

It is to be understood that the above-described arrangements of apparatus and construction of component mechanisms are simply illustrative of an application of the principles of the invention and many other modifications may be made without departing from the invention.

What is claimed is:

1. In an apparatus for moving articles in diverse directions in different planes;
  a platform having a first guide slot and a second guide slot intersecting said first guide slot and extending therefrom in a diverse direction;
  means mounting said platform for movement from a first plane into a second plane;
  means for moving an article along said first guide slot to the intersection with said second slot;
  means rendered effective upon said moving means advancing an article to said intersection for moving said platform into said second plane; and
  means operative upon movement of said platform into said second plane for moving said article from said intersection and along said second guide slot.

2. An apparatus for lifting and transferring successive articles from a first conveyor advancing articles at a first level to a second conveyor which advances articles at a second level;
  a lift platform at said first level having a T-shaped slot, one branch of which receives an article from the advancing first conveyor and seats the article at the intersection of the slots of said T-shaped slot;
  means for moving said platform and the article to the level of the second conveyor; and
  an auxiliary feeder for clamping and moving the article along another of the slots of said T-shaped slot onto the second conveyor.

3. In an apparatus for transferring an article having a projecting portion;
  a lift platform having a first slot extending to an edge thereof and second slot intersecting the first slot and extending to the edge of the platform;
  means for advancing an article into said first slot with its projecting portion overhanging an edge of said first slot;
  means for moving said lift platform to elevate the article; and
  means rendered effective upon completion of the movement of said lift platform for engaging the projecting portion and advancing said lifted article along said second slot.

4. In an apparatus for transferring articles, each having a flange and a depending stud;
  means for advancing said articles seriatim;
  a lift device including a platform having a first slot formed thereacross and a second slot extending traversely from said first slot;
  means for moving said lift device from a first position wherein the first slot intersects the path of movement of the depending studs to a second position remote from said first position to lift an article by engaging the flange thereof with edges of said first slot; and
  means rendered effective upon said lift device moving from said first position to said second position for gripping the flange of a lifted article and moving said article to advance said depending stud along said transverse slot.

5. An apparatus for transferring articles from a cyclically advancing row of articles into receiving nests on a conveyor which is cyclically advanced with the articles, where the row of articles moves in a first elevation and the conveyor moves at a second elevation and is offset with respect to said advancing row of articles, the improvement which comprises:
  a lift platform having a first slot extending to an edge of said platform in the path of movement of the advancing row of articles, and second slot running from said first slot to an edge of said platform and in a direction toward the path of movement of the nests on the conveyor;

means for cyclically lifting the platform to lift articles advanced into the first slot to said second elevation to position said each lifted article in register with a nest in said conveyor; and means operative upon lifting of said platform to said second elevation for engaging a lifted article and advancing said article along and out of said second slot into a receiving nest on said conveyor.

6. In a device for transferring discs, each having a depending stud wire;

a platform having a T-shaped slot of a width sufficient to accommodate each depending stud wire while the disc overlies and is supported by ledges defining the slot, the cross section of said slot extending completely across said platform and the stem section of said slot extending from the intersection with said cross slot to the edge of the platform;

means for advancing discs and depending leads through said cross slot to said intersection and then from said intersection; and means operative upon each disc being advanced to said intersection for advancing the disc with the depending stud wire riding in said stem slot to said edge of said platform, and means for advancing discs from said edge back down said stem slot to said intersection.

7. In a device as defined in claim 6 wherein said platform forms the base at a U-shaped bracket; and said bracket includes side walls in which are formed a pair of slots extending from said cross slot, said side wall slots being of sufficient width to accommodate each disc advanced into and out of said cross slot.

8. An apparatus for supporting and transferring articles having an enlarged upper section and a smaller, elongated lower section from a conveyor to a receiving device and back to the conveyor, comprising:

a holder having a flat article supporting surface;

said holder having a first slot, through which the articles are to be passed, extending the length of the supporting surface of said holder, said slot being wider at opposite ends than the upper section of the articles which are to be passed therethrough and tapering to form a restricted portion which is narrower than the upper section of the articles, but wider than the lower section, so that upper sections of the articles may be supported by the supporting surface;

said holder also having a second slot in the surface extending from the restricted portion to one edge of the surface of said holder, the width of said second groove also being restricted; and means for (1) advancing an article along the first slot into said restricted portion to support the enlarged upper section on the restricted portion, (2) transferring the article along the second slot, (3) transferring the article back down the second slot, and then (4) advancing the article along the first slot and out of the opposite end of the holder.

9. An apparatus for supporting and transferring a semiconductor header, having a depending lead, from a conveyor to a receiving device and back to the conveyor;

a U-shaped holder having a platform interconnecting perpendicular sidewalls;

said holder having a first slot which extends the length of the platform and passes through both of the sidewalls, said slot being wider at both ends than the header to allow entry and exit from the slot, and tapering along the platform to form a restricted portion between the ends of the slot to support the header on the platform with the depending lead passing through said slot;

said holder having a second slot in the platform perpendicular to said first slot and extending from the restricted portion to one edge of the platform, the width of said second slot being also restricted to support the header on the platform;

means mounting said holder for movement from a position in which the slot is aligned with a header on the conveyor to a position in alignment with the receiving device;

means for feeding a header through the slot in the first sidewall while said holder is in alignment with the conveyor to advance a header into the restricted portion to position said header upon the platform;

means operative after the advance of a header into the restricted portion for moving said holder and platform from alignment with the conveyor to alignment with the receiving device;

a clamp having a pair of opposed jaws for grasping the header;

means mounting said clamp in alignment with the work-receiving device for movement in a direction along said second slot;

means for moving said clamp to transfer the header from the restricted portion along said second slot to the work-receiving device;

means for reoperating the clamp to withdraw a header from the work-receiving device and move the header to a restricted portion of the slot; and means for returning the holder to the initial position whereupon said conveyor moves the header out of the holder through the slot in the second sidewall.

References Cited

UNITED STATES PATENTS

| | | | |
|---|---|---|---|
| 2,662,646 | 12/1953 | McCain | 214—1 |
| 3,243,036 | 3/1966 | Fegley | 198—210 |
| 3,407,949 | 10/1968 | Fegley | 214—1 X |

EVON C. BLUNK, Primary Examiner

D. WATTS, Assistant Examiner

U.S. Cl. X.R.

214—1